United States Patent Office 3,364,601
Patented Jan. 23, 1968

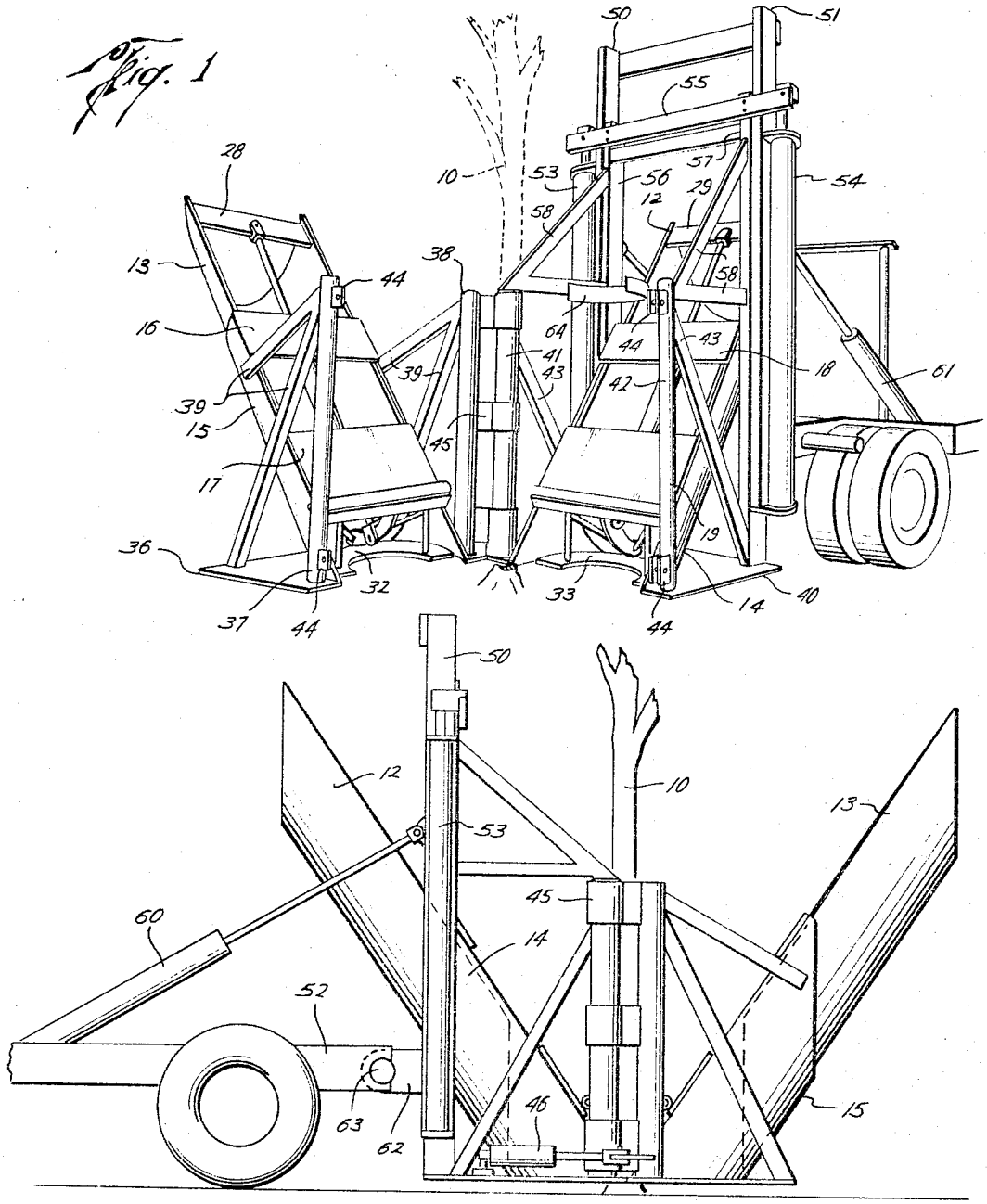

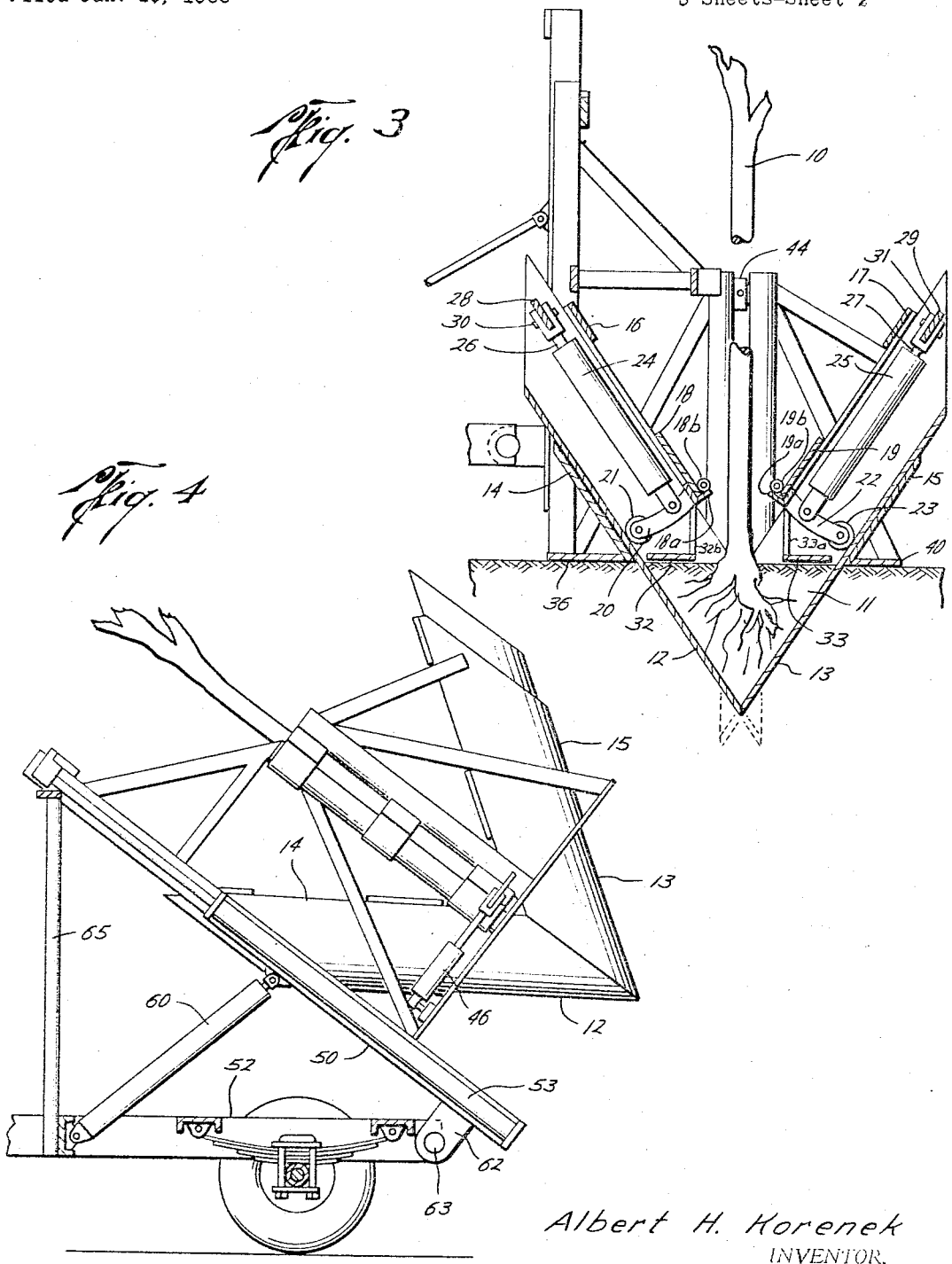

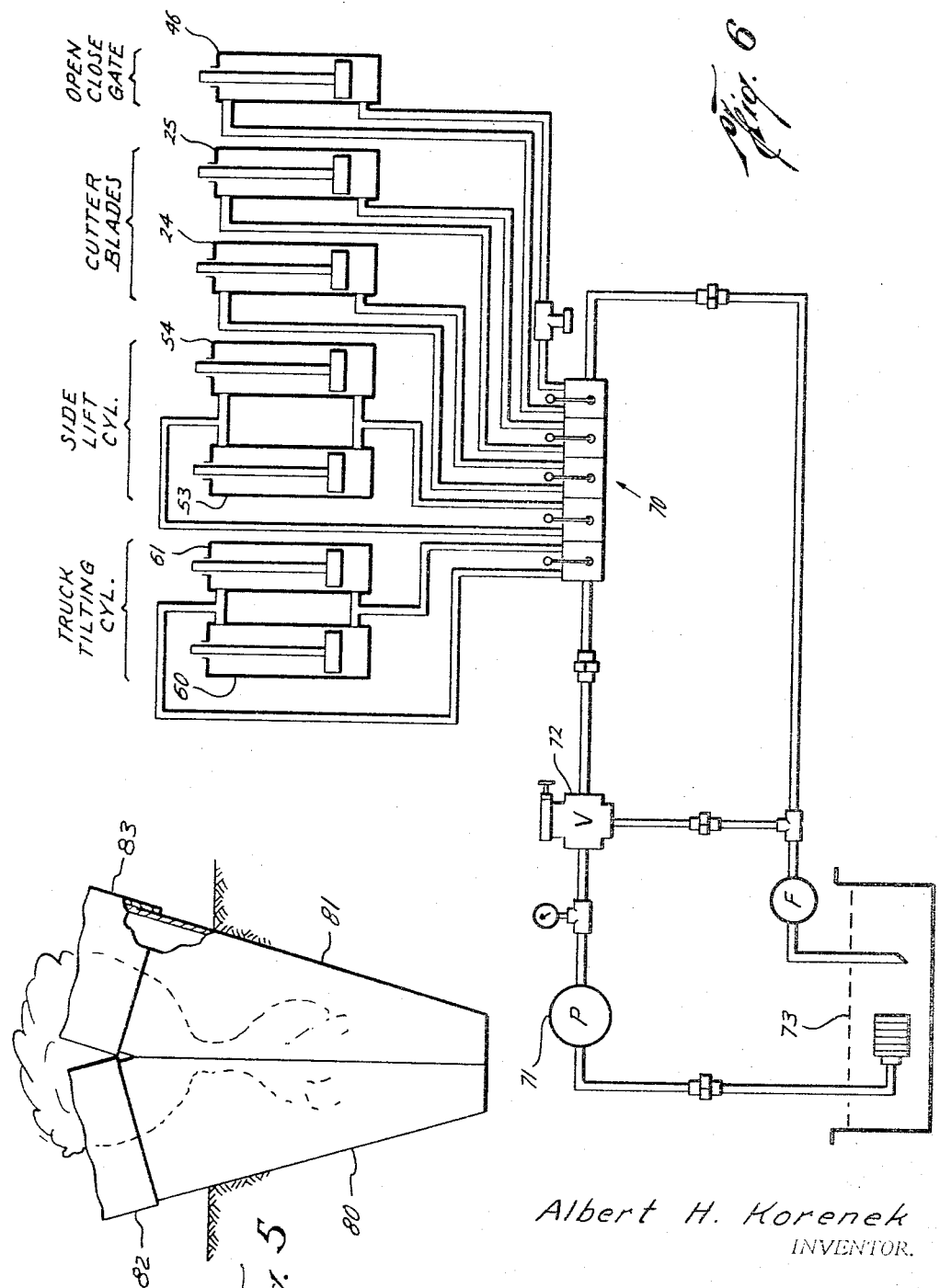

3,364,601
APPARATUS FOR EXCAVATING PLANTS FOR TRANSPLANTING
Albert H. Korenek, Rte. 2, Box Q, Angleton, Tex. 77515
Filed Jan. 19, 1966, Ser. No. 521,578
10 Claims. (Cl. 37—2)

ABSTRACT OF THE DISCLOSURE

Transplanting apparatus is disclosed that employs two ground piercing blades for excavating a plant along with a root ball. The blades are positioned on opposite sides of the plant to be transplanted and they are moved independently along their longitudinal axes into and out of the ground. The blades slide in guide chutes that guide the blades along convergent paths as they are forced into the ground. The blades are trough shaped in transverse cross section and the ends of the blades are shaped to form a container around the root ball that they sever from the ground when they are moved into engagement below the plant. The plant to be transplanted and the root ball severed by the blades is lifted out of the ground by moving the guide chutes upwardly with the ends of the blades in engagement below the root ball.

---

This invention relates generally to apparatus for excavating plants for transplanting, and in particular, to such apparatus that will excavate the plants along with at least a portion of their roots and the earth in which the roots are located.

Plants that are transplanted with the least damage to their rootlets and root hairs have the best chance of surviving in their new location, all other things being equal. Therefore, preferably, a plant is moved along with a "root ball," i.e., with at least a portion of its roots still embedded in the earth in which the plant was growing. This allows the roots in the root ball to continue to nourish the plant after it is transplanted until new root growth can take place. Any relative movement between the earth and the roots in the root ball, however, tends to break off or damage the rootlets or tiny root hairs.

Therefore, it is an object of this invention to provide apparatus that will sever a root ball from the ground with a minimum of disturbance to the earth and roots therein.

It is another object of this invention to provide apparatus for excavating a root ball from the ground that will hold the earth in the root ball in place around the roots of the plant as the root ball and plant are lifted out of the ground and moved to a new location.

It is another object of this invention to provide apparatus for excavating a root ball from the ground that has earth piercing blades for severing the root ball that are sufficiently rigid to be guided along the desired path through the ground from above the ground level and which will form a container that will encircle and support the root ball as it is lifted from the ground.

It is another object of this invention to provide apparatus for excavating a root ball from the ground which employs concavo-convex ground piercing blades that cut a conically shaped root ball from the ground and form an annular ring around the conical surface of the root ball to support it as the root ball and the plant are moved to a new location.

It is an object and important feature of this invention to provide apparatus that employs a pair of oppositely disposed ground piercing blades that are trough shaped in transverse cross section. Being so shaped the blades can be made thin so as to require a minimum amount of force to be pushed into the ground and to cause a minimum amount of disturbance to the ground as they enter therein, yet they will be rigid enough to be supported and guided from above the ground for movement into the ground at the desired angle thereto and along the desired path to completely sever a root ball from the ground. Also, blades so shaped can move into engagement below the plant and form a solid walled container to support the root ball and the plant as it is raised from the ground and moved to its new location.

After the root ball is lowered by the ground piercing blades into the hole provided to receive it, the blades must be removed. The withdrawal of these blades, however, exerts an upward frictional force on the earth in the root ball that is in contact with the blades. This tends to disturb the root ball and to move the earth therein relative to the roots. Therefore, it is yet another object of this invention to provide apparatus for excavating a root ball with earth piercing blades that will hold to a minimum the movement of the earth in the root ball as the blades are withdrawn from the hole in which the root ball is located.

These and other advantages, objects, and features of the invention will be apparent to those skilled in the art from a consideration of this specification and attached drawings.

A preferred embodiment of the invention will now be described in detail in connection with the attached drawings in which, FIGURE 1 is an isometric view of the preferred embodiment of the apparatus of this invention mounted on a truck and in position preparatory to being placed around a tree to be excavated;

FIGURE 2 is a side view of the apparatus of FIGURE 1 in place around the tree to excavate the same along with a root ball;

FIGURE 3 is a partial vertical sectional view of the apparatus of FIGURE 2 showing the ground piercing blades of the apparatus after they have severed the root ball from the ground preparatory to lifting the tree and its root ball from the ground for movement to its new location;

FIGURE 4 shows the apparatus of the invention after the tree and its root ball have been lifted above the ground and tilted so as to incline the tree over the truck for movement to the new location;

FIGURE 5 is a view of an alternate design for the ground piercing blade of the invention, and FIGURE 6 is a schematic view of the hydraulic system employed to power the apparatus shown in FIGURES 1–4.

In FIGURES 1–4 the apparatus of the invention is shown excavating tree 10 from the ground along with a root ball 11. To sever root ball 11 from the ground, two ground piercing blades 12 and 13 are employed. By shaping these blades so that they are trough shaped in transverse cross section, they can be made thin enough to pierce the ground around the tree with a minimum amount of force and to sever a root ball with a minimum of disturbance of the earth in the root ball. Also, with this shape the blades are sufficiently rigid to need only support and guidance from apparatus located above the ground in order to travel into the ground in the desired direction along the desired path. In the embodiment shown, earth piercing blades 12 and 13 are semi-circular or concavo-convex in cross section. The term trough shaped, however, is intended to include all shapes from semi-circular to U- or V-shaped in transverse cross section.

Means are provided to guide the earth piercing blades for movement along their longitudinal axes. In the embodiment shown, blades 12 and 13 are slidably supported and guided for such movement by guide chutes 14 and 15, respectively. These guide chutes have concave surfaces shaped to engage closely the convex side of the blades. Therefore, in the embodiment shown they are semi-circular in transverse cross section. Also, preferably, the guide chutes are long enough to support substantially all of the blades that remain above the ground.

To help hold the blades in the chutes, and also to provide additional rigidity to the chutes, cross members are arranged to span the concave side thereof. Thus, cross members 16 and 17 extend across the concave portion of chute 15, and cross members 18 and 19 are arranged in the same manner across the concave portion of chute 14. These members are attached to the edge surfaces of the chutes in any appropriate manner, such as by welding.

These cross members also provide a base for additional means for holding the blades in sliding engagement with the concave side of the guide chutes. As best shown in FIGURE 3, arm 20 is connected to cross member 18 and provided with a roller 21 to engage blade 12 and hold it in sliding engagement with chute 14. In the same manner, arm 22 is connected to cross brace 19 to support roller 23 which engages blade 13 and holds it in sliding engagement with chute 15.

To add rigidity to cross members 18 and 19 to better support these arms and rollers and the blade moving means to be described below, each cross member includes angles 18a and 19a and tubular members 18b and 19b arranged as shown.

Means are provided to move the blades along their longitudinal axes into and out of the ground. In the embodiment shown, double-acting fluid cylinder assemblies 24 and 25 are connected to arms 20 and 22 respectively with piston rods 26 and 27 connected to cross members 28 and 29. These members extend across the concave side of blades 12 and 13, respectively. The piston rods are connected to cross members 28 and 29 by clevises 30 and 31, which are pinned to the cross members in the manner shown. Thus, by supplying pressure fluid to power cylinder assemblies 24 and 25, the blades will be moved along their longitudinal axes in a direction determined by the position of guide chutes 14 and 15. The blades are long enough for a substantial portion thereof to remain in engagement with the chutes even after they have been forced into the ground. This allows the chutes to guide them throughout the length of their travel and to support the blades, when the blades are supporting the root ball and plant they have excavated.

Guide chutes 14 and 15 are mounted on the apparatus to guide the blades into and out of the ground along convergent paths that intersect at the desired depth below the ground. The distance between the guide chutes and their angle relative to the ground, along with the size and shape of the blades, determine the size and shape of the root ball that will be severed from the ground by the blades. Preferably, the blades are of sufficient size to sever substantially the entire root ball from the ground. Also, preferably, a major portion of the ends of the blades move into engagement and form a closed annular ring around the root ball to provide adequate support for the root ball, when it is lifted out of the ground.

In the embodiment shown in FIGURES 1–4, the ends of the blades that enter the ground are beveled so that they are parallel and approximately perpendicular to the ground surface. The angle of this bevel for each blade will depend, of course, on the angle that the path of the blade makes with the ground surface. So beveled, the ends of the blades will engage, as shown in FIGURES 3 and 4, and form a solid walled container to completely support the root ball which reduces to a minimum the amount of relative movement between the earth and the roots, thereby reducing considerably the possibility of damage to the rootlets and root hairs of the plant as it is being transplanted from one location to another.

To insure that all of the roots are completely severed and the root ball will be free to be lifted out of the ground, it is the preferred practice, first to move the blades into the ground until they approach each other, then to alternately move each blade past the end of the other, as shown by the dotted lines in FIGURE 3, after which their ends can be moved into engagement to enclose the root ball.

Means are provided to support the chutes to guide the blades along the desired path. In the embodiment shown, chute 15 is supported at the desired angle to the ground by a framework including horizontal ground plate 36, two upright columns 37 and 38, located on opposite sides of the chute, and struts 39, which tie together the post, the plate, and the chute. In the same manner guide chute 14 is mounted on a similar framework made up of ground plate 40, upright posts 41 and 42, and struts 43. Both ground plates 36 and 40 have a concave semi-circular surface to engage the outside surface of chutes 14 and 15, respectively, adjacent their lower ends to provide rigid support therefor.

In apparatus employing only two earth piercing blades, such as the type shown, it is desirable to locate the blades on opposite sides of the plant. Therefore, post 38 is pivotally connected to post 41 by hinges 45, so that chute 15 and its supporting framework can be pivoted away from chute 14, as shown in FIGURE 1, to receive a plant, such as tree 10. After tree 10 is between the chutes, chute 15 and its framework can be swung back into position opposite chute 14. To rigidly connect the two supporting frameworks together so that they will stay in the proper position during the excavating operation, post 37 is connected to post 42 by pins, which extend through gusset plates 44 attached to the post. Since chute 15, blade 13 and their supporting framework may be quite heavy, power means such as hydraulic cylinder 46, is provided to move the assembly on hinges 45.

Means are provided to lift the guide chutes and their supporting frames upwardly to lift the plant and the root ball out of the ground after the blades have been forced into the ground to sever the root ball. In the embodiment shown, two spaced, vertical, channels 50 and 51 are connected together in parallel relationship to bed 52 of the truck upon which the apparatus is mounted, as shown in FIGURES 1 and 2. Mounted along the outside of each channel are power cylinders 53 and 54. The piston rods of these cylinders are connected to cross member 55, which in turn is connected to members 56 and 57, which slide longitudinally along channels 50 and 51. Members 56 and 57 are connected to ground plate 40 and to posts 41 and 42 of the framework supporting guide chute 15 through struts 43 and 58. Thus, power cylinders 53 and 54 can move the excavating apparatus vertically, either upwardly away from the ground so it is supported by the truck, or downwardly into engagement with the ground. Power cylinders 53 and 54 are double acting so a portion of the weight of the truck can be used if necessary to hold ground plates 36 and 40 against the ground against the upward force on the apparatus, when the blades are forced into the ground.

In operation, post 37 is disconnected from post 42 and guide chute 15 and its supporting frame are pivoted to one side by cylinder 46, as shown in FIGURE 1, to allow the truck to be backed into position with the tree 10 to be excavated the proper distance from the lower end of guide chute 14. After positioning the apparatus, guide chute 15 and its supporting frame are pivoted back into position where post 37 can be reconnected to post 42. Next, the entire apparatus is lowered by fluid cylinders 53 and 54 either into engagement with the ground or as close thereto as desired. Power cylinders 24 and 25 then move ground piercing blades 12 and 13 into the ground. As stated before, preferably, each blade is alternately moved ahead of the other to insure that root ball 11 is completely severed from the ground. The blades then are positioned, as shown in FIGURE 3 with their end surfaces in engagement and forming a solid walled container around root ball 11. Fluid cylinders 53 and 54 can now lift the entire apparatus upwardly and blades 12 and 13 will lift root ball 11 and tree 10 out of the ground. Tree 10 is then ready to be moved and replanted in another location.

It is desirable to have a similar shaped hole ready to receive root ball 11. Such a hole can be provided by employing the apparatus used to excavate the tree to excavate a similarly shaped section of earth at the point where the tree is to be planted. The section of earth that is removed to make way for the tree can then be moved back and placed in the hole left by the removal of the tree and the surface of the ground will show little or no damage as a result of the transplanting operation.

Usually, the plant, particularly if it is a tree, will be moved some distance to be replanted. To facilitate moving the tree along highways and roads the apparatus is tilted, as shown in FIGURE 4, to lower the height of the tree and to distribute the weight thereof more evenly over the truck bed. For this purpose, channels 50 and 51 are pivotally mounted on truck bed 52 by gussets 62 and pins 63, as shown in FIGURES 2 and 4. Fluid cylinders 60 and 61 are connected between the truck bed and the channels to pivot the apparatus from the upright position to the position shown in FIGURE 4 and back again when the tree reaches the place where it is to be planted. To keep the tree from falling over when the apparatus has been tipped in this manner, a U-shaped supporting bracket 64 is positioned as shown in FIGURE 1 to engage the trunk of the tree. If desired, support 65 can be located on the truck to engage channels 50 and 51 to help support the apparatus in the inclined position.

FIGURE 3 also illustrates the position of the apparatus after it has lowered root ball 11 of tree 10 into a hold provided to receive it but before the blades have been removed from around the root ball. Means are provided to hold the earth in the root ball from moving upwardly with the blades, which would break up the root ball. In the embodiment shown, earth retaining plates 32 and 33 are supported from cross members 18 and 19, respectively. Each plate is semi-circular and, preferably, has a radius of curvature such that its outer edge can be located close to the concave surface of the blade which it is adjacent. Thus, by positioning the plates, through support arms 32a and 32b, so that they are close to or in contact with the top surface of the root ball, they will hold the earth therein in place as the blades are moved upwardly out of engagement therewith.

When transplanting trees, unless the tree is unusually small, there will be roots extending well below the bottom of the root ball to be removed. For this reason, when moving trees or other large plants the blades are shaped usually to engage along their entire ends to insure that all of the roots in the root ball have been severed from the portion of the roots to be left in the ground. This allows the root ball to be lifted clear of the ground without having to break off some roots in the process, which would tend to disturb the earth in the root ball. When removing small plants, such as shrubs and bushes, however, it is not necessary to have the blades engage directly below the plant, for the roots of these plants do not extend that far down. Therefore, for bushes and other small plants, blades shaped as blades 80 and 81 in FIGURE 5, can be employed. Only, the lower ends of the blades and their guide chutes 82 and 83 are shown for the sake of simplicity.

Since the entire ends of these blades need not engage below the plant, the angle that the blades make to the ground can be increased. A major portion of the ends of the blades do engage, however, so the blades can form an enclosed ring to provide a solid walled container to support the root ball. The container formed has an open lower end; however, since blades 80 and 81 enter the ground along convergent paths, the root ball they cut and the container they form will have upwardly sloping sides, the root ball will have to break up to fall out between the lower ends of the blades. The roots, of course, help hold the earth in place. Therefore, blades, such as blades 80 and 81, can be used with the apparatus shown in FIGURES 1–4 to transplant small plants, such as bush 82 with a minimum of damage to the roots thereof.

FIGURE 6 illustrates the hydraulic system employed to operate the excavating apparatus. In the embodiment shown, manually operated valves 70 are provided to control the cylinders. Obviously, the truck tilting cylinders 60 and 61, and the side lift cylinders 53 and 54, operate together, so each pair has only one control valve. Separate control valves are provided for the power cylinders used to move the cutter blades into and out of the ground, however, for reasons explained above.

The hydraulic system includes a pump 71, a pressure relief valve 72, which allows continuous circulation of the hydraulic fluid from sump 73 even though pressure is not being employed in any of the cylinders. All of the power cylinders are of the double-acting type.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombination. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Transplanting apparatus for excavating a plant, such as a tree, from the ground with a root ball, said apparatus comprising, a pair of oppositely disposed ground piercing blades generally trough shaped in transverse cross section, means for moving the blades along their longitudinal axes, means, independent of the blade moving means, guiding the blades along convergent paths into and out of the ground at an angle thereto as the blades move along their longitudinal axes and holding the blades from movement laterally away from said divergent paths, said blades being shaped for a major portion of their ends to engage and form a solid walled container around such root ball when said blades have moved into engagement along said convergent paths, and means for moving the blades upwardly while in engagement to lift such conically shaped root ball out of the ground.

2. The transplanting apparatus of claim 1 in which the ends of the blades are shaped to engage below the plant being transplanted and form a solid walled container that encloses the lower side of the root ball, when the blades have moved into engagement along their converging paths.

3. The transplanting apparatus of claim 2 in which said ground piercing blades are semi-circular in transverse cross section and have their end surfaces that enter the ground formed to engage along substantially their entire length to sever and enclose a right circular cone of earth with the longitudinal axis of the plant approximately intersecting the apex of the cone, when the end surfaces of the blades are moved into engagement.

4. The apparatus in claim 1 in which the blade guiding means includes a plurality of upwardly and outwardly extending blade guiding chutes, each chute being positioned to slidably support and guide a blade as it is moved into the ground.

5. The apparatus of claim 4 in which means are provided to hold each blade in sliding engagement with its guide chute as it is moved into the ground.

6. The apparatus of claim 5 in which each blade extends upwardly into its guide chute sufficiently when the blades are in engagement in the ground for the root ball encircled by the blades to be lifted from the ground by the blades by moving the guide chutes upwardly from the ground.

7. The transplanting apparatus of claim 1 further provided with means for holding the root ball from moving upwardly with the ground piercing blades as the blades are moved upwardly out of engagement with the root ball.

8. The transplanting apparatus of claim 7 in which the holding means includes root ball engaging plates each plate being located above the root ball with an edge adjacent one of said blades, said edge being contoured similar to the surface of the blade to which it is adjacent.

9. Transplanting apparatus for excavating a plant, such as a tree, from the ground with a root ball, said apparatus comprising a plurality of ground piercing blades generally trough shaped in transverse cross section, means for moving each blade independently along its longitudinal axis, means, independent of the blade moving means, guiding the blades along convergent paths into and out of the ground at a fixed angle thereto as the blades move along their longitudinal axes and holding the blades from movement laterally away from said divergent paths, said guide means including a separate guide member for each blade, each of said guide members having a guide surface which is in sliding engagement with a blade and which extends upwardly from the ground along the desired path of travel of the blade to hold the blade from increasing the angle it makes with the ground as the blade is moved into the ground and means for engaging each blade adjacent the ground and on the opposite side of the blade from the guide surface of the guide member to keep the blade from moving away from the guide surface to decrease the angle between the blade and the ground as the blade moves into the ground, said blades being shaped for their ends to engage and form a solid wall container around such root ball when said blades have moved into engagement along said convergent paths, and means for moving the guide members upwardly while the ends of the blades are in engagement to lift such root ball out of the ground.

10. The transplanting apparatus of claim 9 in which the means for holding each blade from moving away from the guide surface of the guide member along which it slides comprises a roller positioned to roll along the blade as the blade is moved into and out of the ground.

References Cited

UNITED STATES PATENTS

| | | | |
|---|---|---|---|
| 2,863,258 | 12/1958 | Gish | 37—2 |
| 3,017,707 | 1/1962 | Sigler et al. | 214—3 X |
| 3,017,719 | 1/1962 | Sigler et al. | 214—3 X |
| 3,191,982 | 6/1965 | Goalard | 37—2 X |

HUGO O. SCHULZ, *Primary Examiner.*